United States Patent [19]

Ohmori et al.

[11] Patent Number: 5,408,478
[45] Date of Patent: Apr. 18, 1995

[54] APPARATUS FOR REPRODUCING A RECORDING WITH REDUCED ERROR CORRECTION ANOMALIES AT LINKING PORTIONS

[75] Inventors: Takashi Ohmori; Ryo Ando, both of Tokyo, Japan

[73] Assignee: Sony Corporation, Japan

[21] Appl. No.: 107,942

[22] Filed: Aug. 17, 1993

[30] Foreign Application Priority Data

Aug. 20, 1992 [JP] Japan .................. 4-244106

[51] Int. Cl.$^6$ .............................................. G06F 11/10
[52] U.S. Cl. ...................................... 371/37.5; 369/54
[58] Field of Search ............... 371/37.5, 37.4, 37.7, 371/38.1, 39.1, 42, 43, 44, 45, 46; 369/54, 53, 58, 59, 116, 124, 13

[56] References Cited

U.S. PATENT DOCUMENTS

| | | | |
|---|---|---|---|
| 4,604,747 | 8/1986 | Onishi et al. | 371/37.4 |
| 4,607,367 | 8/1986 | Ive et al. | 371/37.4 |
| 4,796,261 | 1/1989 | Moriwaki | 371/37.4 |
| 4,819,236 | 4/1989 | Sako et al. | 371/38.1 |
| 5,222,086 | 6/1993 | Fujita | 371/37.5 |
| 5,224,087 | 6/1993 | Maeda et al. | 369/54 |
| 5,243,588 | 9/1993 | Maeda et al. | 369/54 |

*Primary Examiner*—Joseph Ruggiero
*Attorney, Agent, or Firm*—Ian Hardcastle; Limbach & Limbach

[57] ABSTRACT

A reproduction apparatus which can perform error correction decoding processing which allows data at a linking portion of linking recording to be regenerated as much as possible to restrict the invalid data area at the linking portion to a necessary minimum magnitude is disclosed. The production apparatus reproduces a recording medium on which data coded in two or more different series by error correction coding are linking-recorded such that they are recorded at continuous positions at discontinuous points of time and comprises linking position detection means for detecting a linking portion of linking-recording, wrong correction detection means for detecting wrong correction based on the error correction code, and means for rendering the wrong correction detection means inoperative at the linking portion detected by the linking position detection means.

9 Claims, 9 Drawing Sheets

APPARATUS FOR REPRODUCING A RECORDING WITH REDUCED ERROR CORRECTION ANOMALIES AT LINKING PORTIONS

BACKGROUND OF THE INVENTION

1. Field of the Invention

This invention relates to a reproduction apparatus for reproducing a disk on which, for example, digital audio data are recorded, and in which errors resulting from malfunctions of the error correction system caused by linking portions of the recording are reduced.

2. Description of the Related Art

When, for example, an audio signal is converted into a digital signal and is recorded and reproduced, it is recorded after it has been processed by error correction coding processing. Then, upon reproduction, a correctable error is corrected using the error correction coding. As the error correction coding, a cross-interleave Reed-Solomon code (CIRC) system is frequently used (as in, for example, compact disks), since it is superior in that it has a strong error correction capability and is implemented using relatively small-scale circuitry.

Since the CIRC system used for a compact disk is of the convolution type, and is not of the block-completion type, when new data are to be recorded later in a linking relationship to previously-recorded data such that the former is continuous in recorded position while being discontinuous in time from the latter, a great interleave error takes place at the linking portion between them when error correction decoding processing is performed during reproduction.

In the following, this will be described with regard to the CIRC system, using the compact disk as an example.

Figure 1:
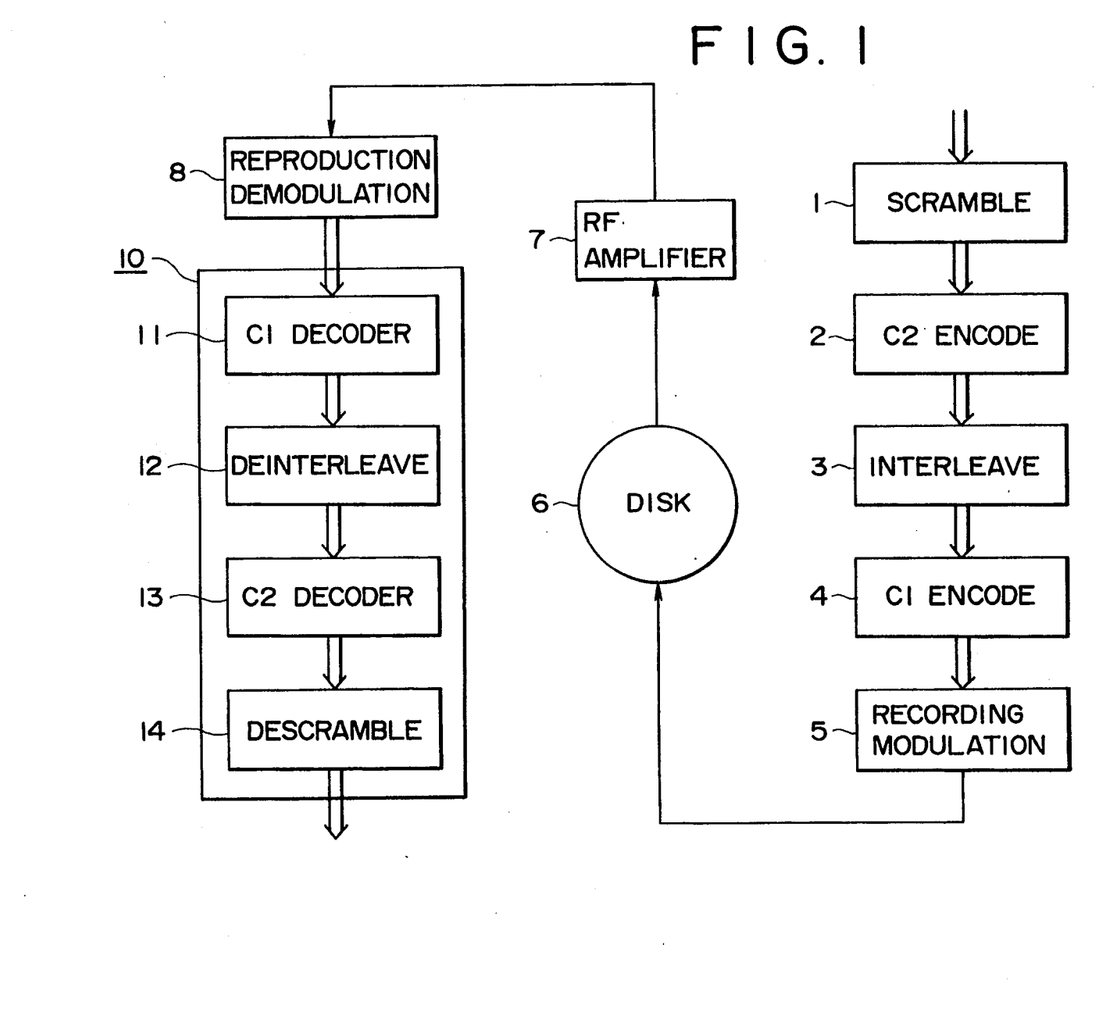
FIG. 1 block diagram illustrating an example of error correction coding and decoding.

FIG. 1 particularly illustrates the recording processing and reproduction processing for the CIRC system in a signal recording and reproduction system for a compact disk. The two Reed-Solomon codes employed in the CIRC system are individually called C1 and C2, and upon recording, digital audio data are supplied in parallel in units of 24 bytes to the scramble circuit 1, in which scrambling of the data is performed. The data are then supplied to the C2 encoder 2, in which a (28, 24, 5) Reed-Solomon code C2 of $GF(2^8)$ is produced and a parity Q of 4-byte length is added to this. Accordingly, data of 28 bytes are obtained from the C2 encoder 2 and are supplied to an interleave circuit 3, in which interleave (rearrangement of data) processing up to a maximum interleave length of 108 frames (1 frame corresponds to 32 bytes) is performed.

Subsequently, the C1 encoder 4 generates a (32, 28, 5) Reed-Solomon code C1 of $GF(2^8)$ and adds a parity P of 4-byte length to this. Thus, data in frames of 32 bytes are obtained from the C1 encoder 4 and are supplied to the recording modulation circuit 5, in which addition of a synchronizing signal, eight-to-fourteen modulation (EFM) and some other necessary processing are performed for the data and the resulting data are converted into serial data. The serial data are recorded onto the disk 6.

Data read out from the disk 6 by means of an optical head are digitized by binary digitizing by the RF (radio frequency) amplifier 7 and are then supplied to the reproduction demodulation circuit 8. The reproduction demodulation circuit 8 performs EFM demodulation and some other necessary processing to obtain parallel data in units of one frame (32 bytes). The parallel data are supplied to an error correction decoding section 10. The error correction decoding section 10 functionally includes the C1 decoder 11, the deinterleave processing section 12, the C2 decoder 13 and the descramble processing section 14.

The Reed-Solomon code C1 allows detection and correction of a 2-byte error, and correction of a correctable error is performed by the C1 decoder 11. After such error correction by the C1 decoder 11, the deinterleave processing section 12 processes the data by deinterleave processing, that is, by rearrangement processing to re-arrange the data which have been re-arranged by the interleave processing performed during recording to restore the original arrangement of the data. Thereafter, the C2 decoder 13 performs error correction decoding processing of the data based on the Reed-Solomon code C2, using the result of the error correction decoding processing performed by the C1 decoder 11. Then, the data are rearranged back to original order of the audio data by the descramble processing section 14 to obtain an output of digital audio data.

Figure 2A:
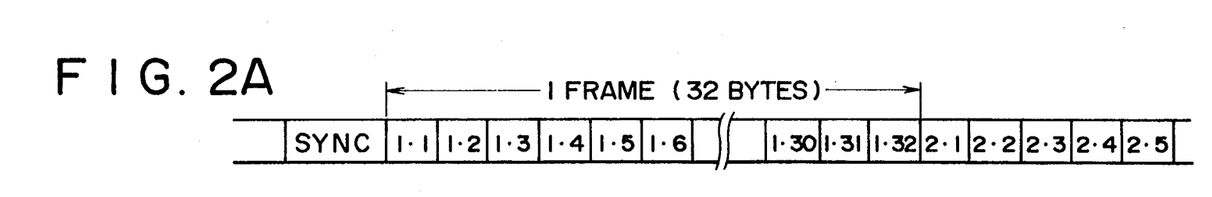
FIGS. 2A and 2B are diagrammatic views illustrating the error correction decoding of FIG. 1.

In the reproduction system of FIG. 1, binary digitized output data of the RF amplifier 7 has the structure shown in FIG. 2A with 32 bytes = 1 frame, where each byte is represented by (m.n) (m is the frame number, and n is the number of the byte in the frame).

Figure 2B:
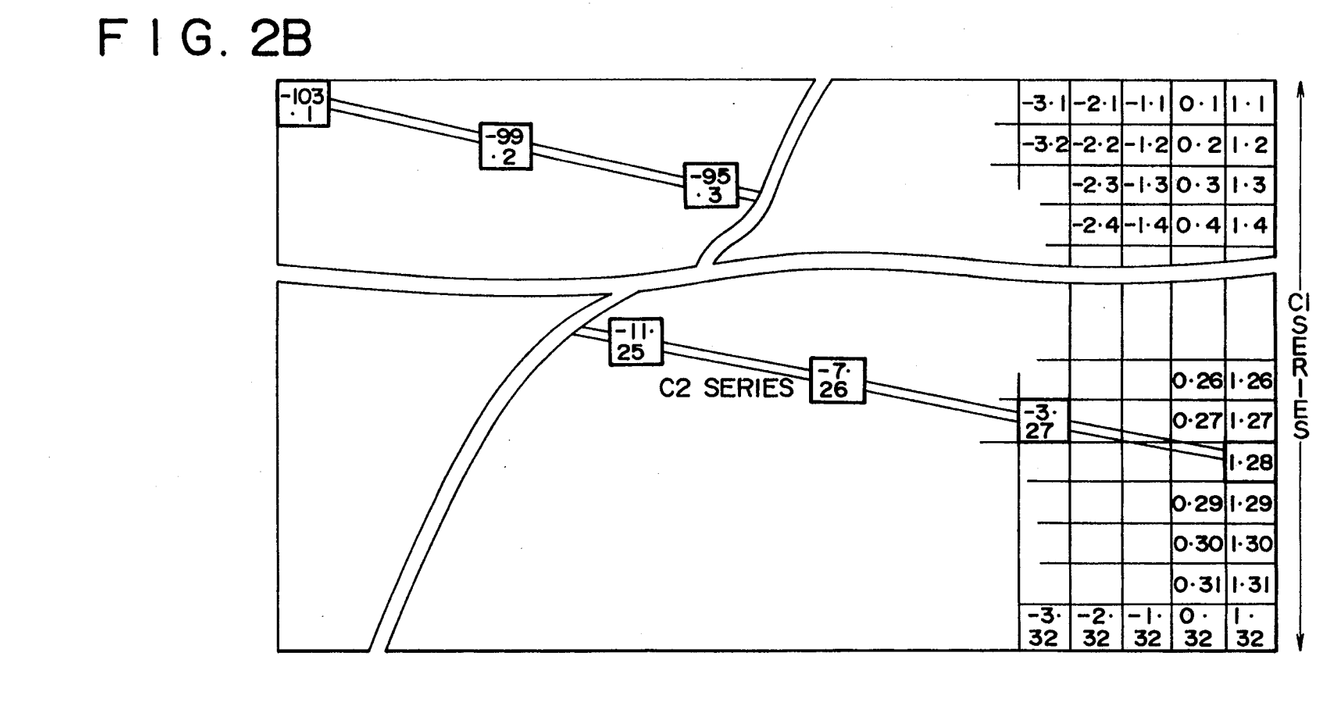

Then, in the error correction decoding section 10, data are practically re-arranged in units of one byte as shown in FIG. 2B in a memory, and the two series C1 and C2 of the re-arranged data are processed for the detection and correction of errors.

The C1 series includes 32 bytes in the vertical column of FIG. 2B, which are data for one frame of the output signal of the RF amplifier 7, for example: data (1.1), (1.2), (1.3), ..., (1.n), ..., (1.31) and (1.32). The lowermost four bytes (1.29), (1.30), (1.31) and (1.32) are the parity P. As described above, the C1 series allows detection and correction of an error of 2 bytes.

Meanwhile, the C2 series includes 28 bytes taken from previously-reproduced data. One byte is taken from every four frames (except for the parity bytes P of the frame), as seen from the oblique line in FIG. 2B. For example, bytes (−103.1), (−99.3), (−95.2), ..., (−107+4n.n), ..., (1.28) as seen from FIG. 2B, and those of the data which are actually utilized as audio data are 24 bytes in the 28 bytes, while the remaining 4 bytes are the parity Q which is used for error detection and correction.

The C2 series also allows the detection and correction of an error of 2 bytes, and if used together with the error pointer indicating the error detection for the C1 series, then error correction of up to 4 bytes is possible.

Figure 3:
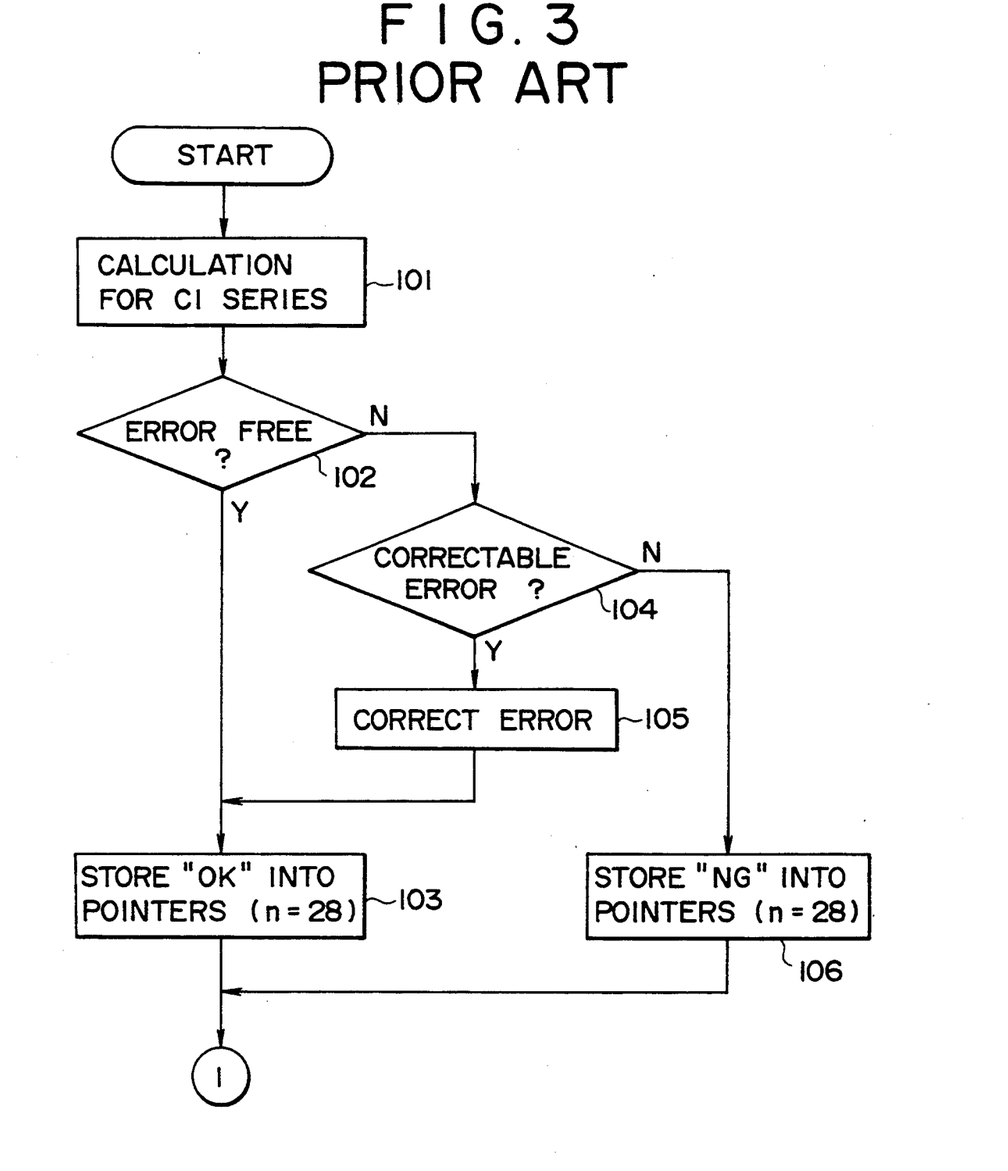
FIGS. 3 and 4 are flow charts illustrating error correction decoding processing of a conventional reproduction apparatus.
Figure 4:
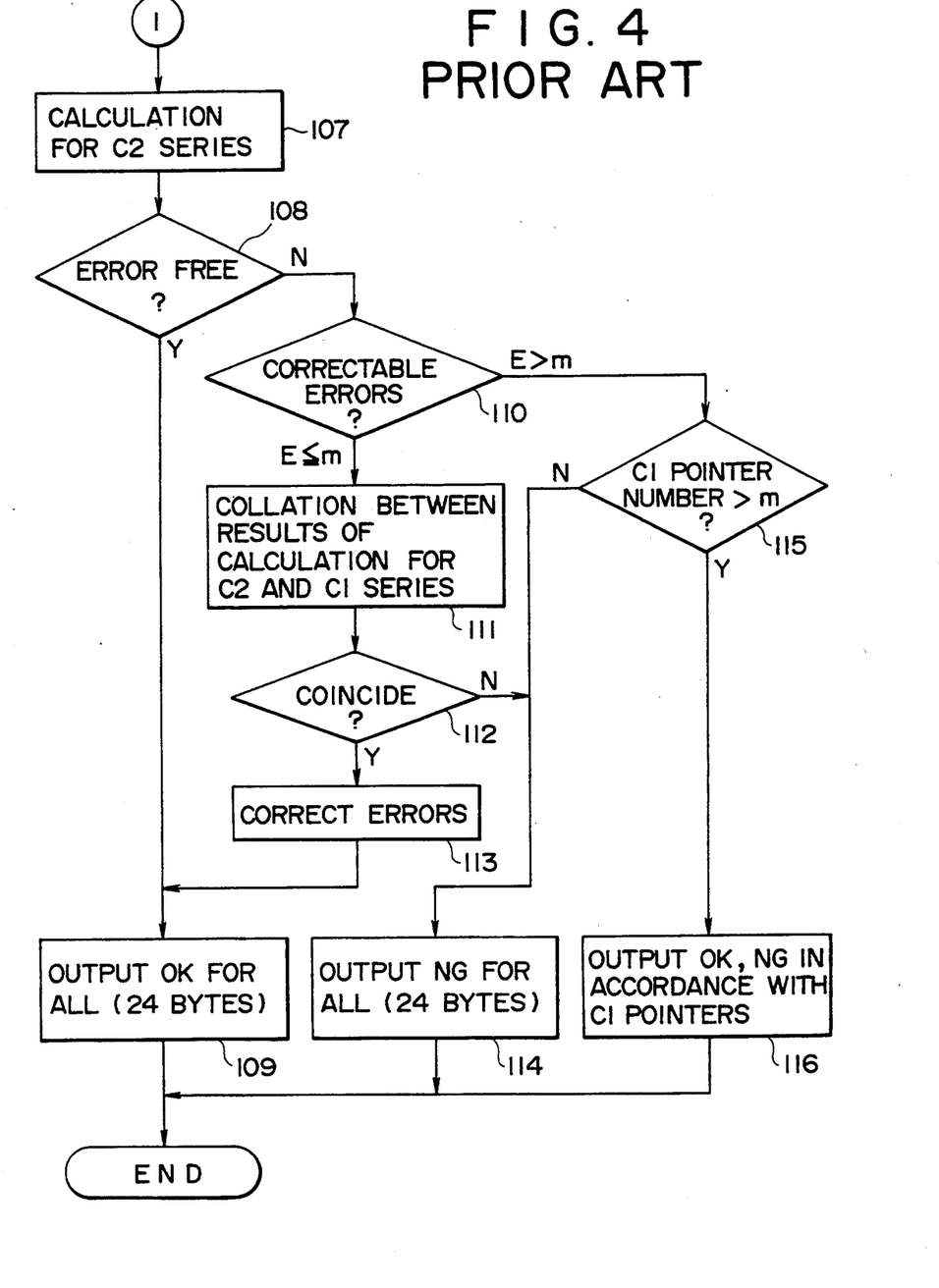

A flow chart of an example of a conventional processing routine for error detection and correction which utilizes such C1 and C2 series is shown in FIGS. 3 and 4.

Referring to FIGS. 3 and 4, calculation of the parity P is performed first for data of the C1 series of 32 bytes of one frame obtained from the RF amplifier 2 (step 101). Next, it is determined whether or not the data of the C1 series include an error or errors (step 102). If the data of the C1 series include no error, the control sequence immediately advances to step 103, where "OK", that is, a code which indicates no error, is written into a pointer (an index representative of whether the byte is or is not an error) for each of the 28 data bytes.

When it is detected at step 102 that the data of the C1 series include an error or errors, the control sequence advances to step 104, where it is determined whether or not the number of errors in the data of the C1 series is equal to or smaller than the number of correctable errors which can be corrected. If the number of errors is equal to or smaller than the correctable error number, that is, the error number equal to or smaller than 2 bytes, the control sequence advances from step 104 to step 105, where the error or errors are corrected. Thereafter, the control sequence advances to step 103, where "OK" is stored into all of the pointers for the 28 bytes.

On the other hand, when it is determined at step 104 that the number of errors detected is equal to or greater than 3 and the errors cannot be corrected, the control sequence advances to step 106, where "NG", that is, a code indicating an error, is written into the pointers for all 28 bytes.

From step 103 or step 106, the control sequence advances to step 107, shown in FIG. 4, where calculation of the parity for the C2 series is performed using the previously-reproduced data, and then to step 108, where it is determined whether or not the C2 series includes an error or errors.

If the C2 series includes no error, then the control sequence immediately advances to step 109, where "OK" is written into pointers for the 24 data bytes of the C2 series and the resulting data are outputted.

On the contrary, when it is determined at step 103 that the C2 series includes an error or errors, the control sequence advances to step 110, where it is detected whether or not the number E of errors in the C2 series is equal to or smaller than the number m of correctable errors which can be corrected (E≦m). Since erasure correction is performed for such error or errors here, the correctable error number m is 4.

If the number E of errors in the C2 series is smaller than the correctable error number m, then the control sequence advances from step 110 to step 111, where the pointers generated by the calculation of the respective C1 series and the results of calculation of the C2 series are collated with each other. Then, it is determined at step 112 whether or not the result of the collation indicates a coincidence in the number of errors between them.

The processing at steps 111 and 112 serves as wrong correction detection means for preventing wrong correction of errors such as detecting correct data as an error and correcting the data in error.

When the result of the determination at step 112 proves coincidence, the control sequence advances to step 113, where correction of the error or errors in the C2 series is performed, and then to step 109, where a flag of "OK" is added to all of the data of the 24 bytes of the C2 series and the resulting data are outputted.

On the other hand, when the result of the determination at step 112 proves non-coincidence between the detected number of errors and the number of "NG" in the pointers of the C1 series, the control sequence advances to step 114, where another "NG" flag is added to all of the pointers of the data of the 24 bytes of the C2 series and the resulting data are outputted.

Further, when the number of errors detected by the calculation of the parity for the C2 series is greater than the correctable error number m at step 110, the control sequence advances to step 115, where it is determined whether or not the number of data bytes whose pointers indicate "NG" is greater than m. This is performed by referring to the pointers of the result of the processing of those C1 series that have bytes in the C2 series.

If it is determined at step 115 that the number of data bytes whose pointers indicate "NG" is equal to or smaller than m, since it is considered that either the error detection for the C1 series or the error detection for the C2 series is wrong, the control sequence advances to step 114, where the flag "NG" is added to all of the pointers of the data of the 24 bytes of the C2 series and the resulting data are outputted.

On the other hand, when the number of data bytes whose pointers indicate "NG" as the result of the processing of the C1 series is greater than m, it is determined that the result of calculation for the C1 series coincides with the result of calculation for the C2 series. The control sequence advances from step 115 to step 116, where the flag of "OK", or "NG" is added to each of the data bytes in accordance with the result of the processing of the C1 series, and the resulting data are outputted.

It is to be noted that, using the flag of "OK" or "NG", interpolation of data is performed for the bytes of "NG" by the technique of average value interpolation or thresholding.

The error flags outputted as the result of error detection and correction based on the C1 and C2 series as described above are divided into the following three categories:

1. No error (no error is detected from the C1 and C2 series;
2. "OK" or "NG" (E>m in both of the C1 and C2 series ); and
3. All errors (results of processing of the C1 and C2 series do not coincide with each other).

Figure 5A:
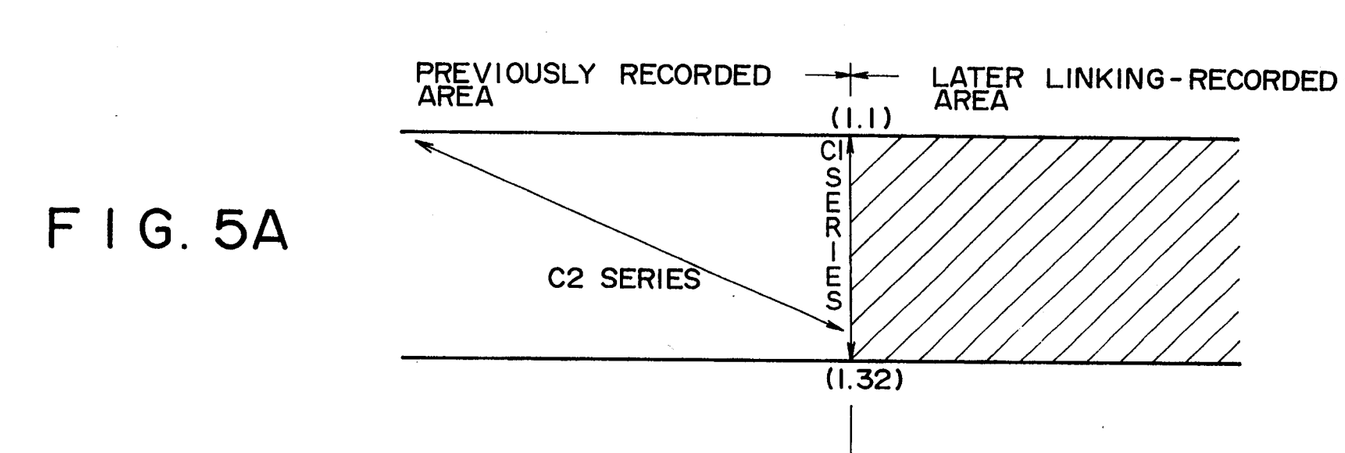
FIGS. 5A and 5B are diagrammatic views illustrating linking recording and production of an error at a linking portion.

If a system which performs error correction decoding processing based on such convolution-type signal processing performs linking recording, in which new data are recorded in a linking relationship to a previously-recorded area, then when data are rearranged in units of one byte in a memory in a manner such as that shown in FIG. 2B, the data are recorded in a condition such as that shown in FIG. 5A. In this condition, there is the problem that the area of the linking portion, in which the data are all determined to be errors, is large, as seen in FIG. 5B.

In particular, at the physical linking position, the clock signal of the previously-recorded data is not synchronized with the clock signal of the subsequently-recorded data. This forces the phase-locked loop (PLL) circuit that synchronizes the clock signal during reproduction out of its phase-locked condition. As a result of this, all data of the C1 series in a section of about 300 bytes in 5 to 10 frames following the physical linking position are determined as consecutive errors. Then, when calculation of parity for the C2 series is performed, data of C2 series up to the C2 series immediately prior to the C2 series indicated at S1 in FIG. 5B (the small circles represent data bytes included in the C2 series) correspond to the case in which one or two errors normally occur, as described above, and thus the errors in them are corrected in almost all cases, and there is no problem. Further, even if errors which cannot be corrected remain, processing appropriate to such a case can be performed, and, again, there is no problem.

Figure 5B:
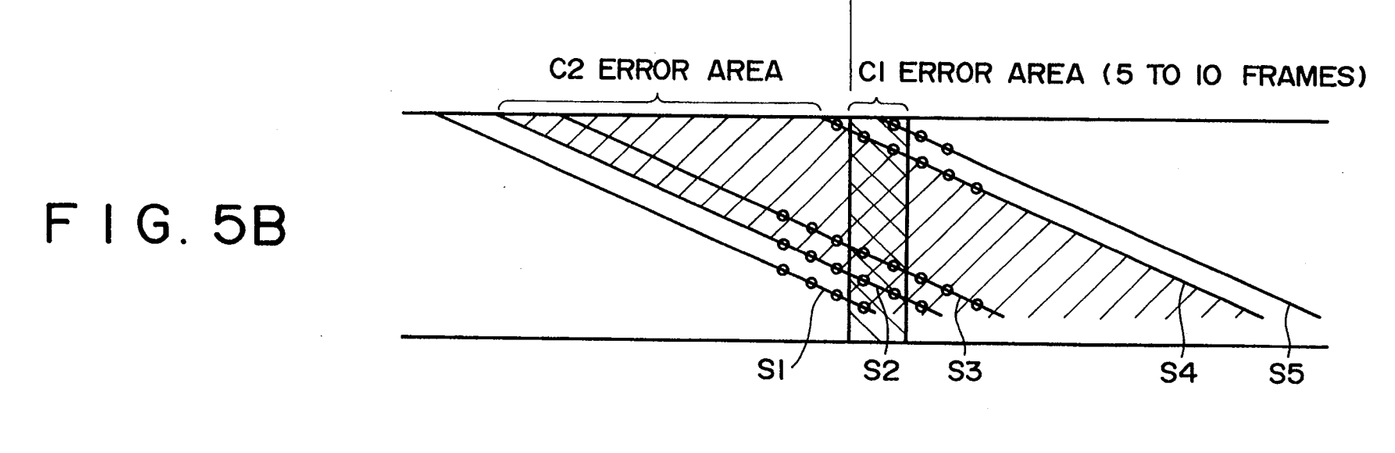

However, in the case of the C2 series indicated at S2 in FIG. 5B, even if it is determined that there is no error outside the C1 error area in FIG. 5B, while the number of errors obtained by calculation of parity for the C1 series is 2, the number of errors is determined to be 3 as a result of calculation of parity of the C2 series. This is because, in addition to the two errors detected from the C1 series, one byte of the data linking recorded later is included in the C2 series. This corresponds to the third abnormal condition described above and is detected at steps 111 and 112 serving as the wrong correction detection means of FIG. 4. Consequently, all of the 24 byte data of the C2 series are determined to be errors. In short, correct data previous to and following the C1 error area, which inevitably generates errors because of the disruption of the clock signal at the linking portion, are also determined to be errors.

The condition in which all of the data bytes of the C2 series are determined to be errors continues as far as the C2 series indicated at S4 in FIG. 5B, and consequently, continuous errors are determined over about 120 frames.

In particular, if conventional error correction decoding processing, such as the routine shown in FIGS. 3 and 4, is executed at the linking portion of a linking recording, the inevitable errors over 10 frames or so are determined in error as continuous errors extending over about 120 frames. The malfunctioning of the error correction decoding results in the disadvantage that data that was originally correctly reproduced from the disk is not correctly decoded.

In a recording and reproduction system conforming to a compact disk such as, for example, a CD-MO, when linking recording is to be performed, a sufficiently large invalid data section is provided at the linking portion to prevent such a disadvantage as that described above. Consequently, when there are a large number of instances of linking recording on a disk, the utilization efficiency of the recordable area of the disk is very low.

Meanwhile, the assignee of the present invention has proposed a disk recording and reproducing apparatus in which audio data are recorded on a magneto-optical disk having a diameter smaller than that of a compact disk, for example, a diameter of 64 mm. The audio data are compressed and are intermittently recorded in recording units of a predetermined amount of compressed audio data. The compressed audio data are read out intermittently from the disk and are stored once into a buffer memory. Then, the data are read out from the buffer memory at a suitable rate and are expanded to reproduce the original audio data (refer to, for example, U.S. patent application Ser. No. 07/745,486, now U.S. Pat. No. 5,317,553).

The disk recording and reproducing apparatus can be formed in such a small size as to allow realization of a portable apparatus since it utilizes a small disk.

With the disk recording and reproducing apparatus described above, since intermittent recording is involved, linking recording is performed for every intermittent recording unit. When the recording unit for such intermittent recording and reproduction is set to 32 sectors of audio data (a sector corresponds to a block of a CD-ROM and is about 2 kbytes), there are about 2,000 linking recording portions on a disk capable of recording an audio signal for 74 minutes. Therefore, providing an area for invalid data at each linking portion would seriously impair the efficiency of use of the recording area of the disk.

Further, while it is possible to provide a user area, into which subdata are to be recorded, immediately prior to the data of each intermittent recording unit, if the area of a linking portion is made excessively small, then when a position error is caused by displacement in rotation of a disk or the like, there is a disadvantage in that data in the subdata area may not possibly be reproduced.

SUMMARY OF THE INVENTION

It is an object of the present invention to provide a reproduction apparatus which can perform error correction decoding processing which allows data at a linking portion of a linking recording to be regenerated while minimizing the extent of the invalid data area at the linking portion.

In order to attain the object described above, according to the present invention, there is provided a reproduction apparatus for a recording medium on which data coded in two or more different series by error correction coding are linking-recorded such that they are recorded at continuous positions at discontinuous points of time. The reproduction apparatus comprises linking position detection means for detecting a linking portion of the linking recording, wrong correction detection means for detecting wrong correction based on the error correction code, and means for rendering the wrong correction detection means inoperative at the linking portion detected by the linking position detection means.

Where the error correction code is the CIRC described above, with a conventional reproduction apparatus, since the parity calculation of the C2 series is performed after the parity calculation of the C1 series and the wrong correction detection means for confirming coincidence between the results of the calculations is operative at the linking portion of a linking recording, the section over which successive errors are detected is long.

However, with the reproduction apparatus of the present invention, the wrong correction detection means is rendered in operative (that is, error correction based on the C2 series is not performed), at each linking portion. Consequently, the section of successive errors is restricted to the comparatively short physical error section which is produced by a cause such as disruption of the PLL circuit that generates the reproduction clock signal. This physical error section can be determined, for example, from the result of the parity calculation of the C1 series. Accordingly, the size of the invalid data area resulting from a linking recording can be reduced, and a high utilization efficiency can be provided for the recording area.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

Figure 6:
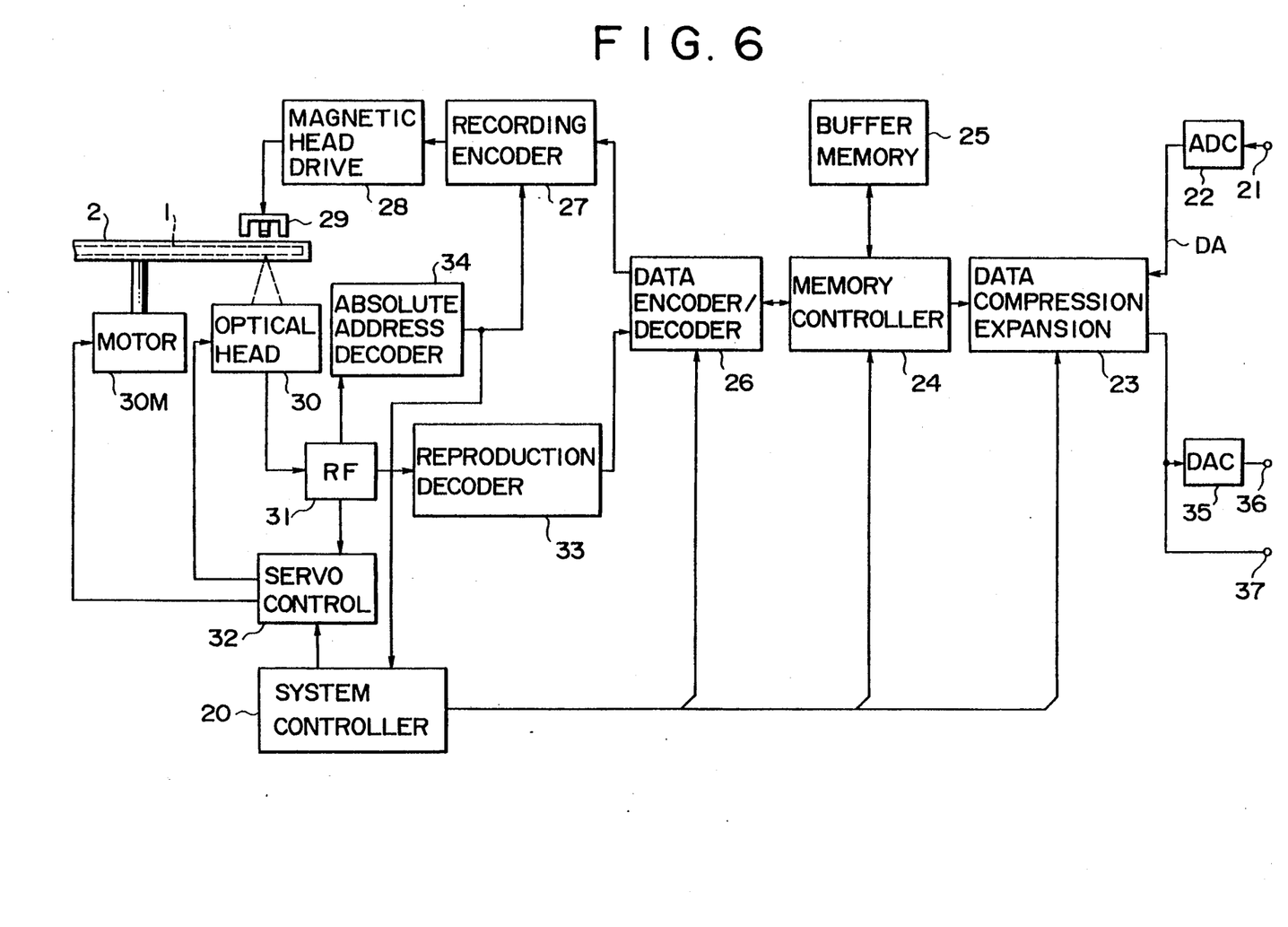
FIG. 6 is a block diagram of a disk recording and reproducing apparatus showing a preferred embodiment of the present invention.

Referring first to FIG. 6, there is shown a disc recording and reproduction apparatus according to a preferred embodiment of the present invention wherein audio data are compressed and recorded onto a disk of a size smaller than a compact disk. Then, upon reproduction, the recorded compressed data are expanded to reproduce the original audio data.

The recording and reproduction apparatus is designed to record an optical disk 1. The optical disk 1 preferably has an outer diameter of 64 mm and has a spiral recording track formed thereon at a pitch of, for example, 1.6 μm. The disk 1 is rotated under control of the servo circuit 32 to provide a fixed linear velocity in the range of 1.2 to 1.4 m/sec, for example, between the recording track and the optical head 30, as will be described below. More than 130 Mbytes of compressed audio data can be recorded on the disk as an audio signal is converted into digital data which are compressed and recorded onto the disk 1.

The disk 1 for an object of reproduction may be a disk of any of several different types, as will be described below. For example, the disk 1 may be a playback-only optical disk, which is used exclusively for reproduction and is formed by, for example, injection molding or a like manufacturing method. The data recorded on the disk are represented by lines of pits formed in the recording track of the disk. Alternatively, the disk 1 may an erasable, rewritable magneto-optical disk having a magneto-optical recording film and capable of being recorded, reproduced and erased.

Further, the disk 1 has pregrooves formed in advance of recording thereon for control of the position of the optical spot on the recording track (tracking control). In particular, it has absolute address codes recorded in the pregrooves in an overlapping relationship with a wobbling signal for tracking. Further, the disk 1 is housed in a disk cartridge 2 to prevent dust from damaging the disk 1.

Information regarding the audio data recorded on the disk 1 is recorded at an innermost track position of the disk 1. The information is commonly called TOC (Table of Contents) and includes the number of musical pieces recorded on the disk 1, information regarding recorded positions of the individual musical pieces, the play times of the musical pieces and so forth.

Recording System of the Recording and Reproduction Apparatus

The recording and reproduction apparatus of FIG. 6 employs a minimum number of integrated circuits (ICs) to simplify its construction as far as possible. First, recording onto the magneto-optical disk will be described. It is to be noted that, for changing over between recording and reproduction, the mode of the circuit components of the recording and reproduction apparatus is changed in response to a mode changing over signal R/P from a system controller 20, which is constituted using a microcomputer. An input key section (not shown) is connected to the system controller 20 so that the operational mode of the recording and reproduction apparatus can be designated by an inputting operation performed using the input key section.

An analog stereo audio signal having a left channel and a right channel inputted via the input terminal 21 is sampled with a sampling frequency of 44.1 kHz by the analog-to-digital (A/D) converter 22 to convert it into a digital signal in which each sample value is formed of 16 bits. The 16-bit digital signal is supplied to the data compression/expansion circuit 23. The data compression/expansion circuit 23 acts as a data compression circuit during recording, but acts as a data expansion circuit during reproduction. The data compression/expansion circuit 23 includes a buffer memory (not shown) for storing the data subject to compression and expansion.

During recording, input digital data are compressed, for example, to about one fifth by the data compression/expansion circuit 23. Any of various data compression methods may be employed. For example, ADPCM (Adaptive Delta Pulse Code Modulation) of a quantizing number of 4 bits can be employed.

Alternatively, and preferably, the input digital data are divided into plural bands such that the band width increases as the frequency increases, and a block of plural samples is formed in each of the bands such that the number of samples in each block is equal in the different bands. An orthogonal transformation is performed on each block of each band to obtain coefficient data, and then adaptive bit allocation is performed on the coefficient data (See, for example, U.S. Pat. No. 5,115,240, the disclosure of which is incorporated herein by reference). This data compression method takes the characteristics of the human sense of hearing into consideration, and provides data compression with a high efficiency.

Digital data DA from the A/D converter 22 are compressed to about one fifth by the data compression processing performed by the data compression/expansion circuit 23, and the compressed data are transferred to a buffer memory 25 which is controlled by a shockproof memory controller 24. A dynamic random-access memory (DRAM) having a capacity of 1 to 4 Mbits is used as the buffer memory 25.

If track jumping, in which the recording position on the recording track on the disk 1 jumps as a result of vibration or some other cause, does not occur during recording, the memory controller 24 transfers the compressed data from the buffer memory 25 to the data encoder/decoder circuit 26. The compressed data is intermittently read out of the buffer memory 25 in a recording unit of a predetermined size and is transferred at a transfer rate equal to about 5 times the disk writing rate, as will be described below.

During recording, the data encoder/decoder circuit 26 acts as an encoder circuit and encodes the compressed data transferred thereto from the buffer memory 25 into the sector structure of a CD-ROM. One sector corresponds to about 2 kbytes. In this instance, the data of one recording unit includes 32 sectors of the audio data. It is to be noted that the data of a recording unit including 32 sectors of audio data will be from now on referred to as a cluster.

Further, during recording, the memory controller 24 performs memory control during normal operation so that the amount of data accumulated in the buffer memory 25 is minimized as far as possible. For example, if the amount of data of the buffer memory 25 exceeds a preset predetermined amount, then data for one cluster are read out from the buffer memory 25 and transferred to the data encoder/decoder circuit 26 so that the write space left in the buffer memory 25 is always greater than the predetermined amount.

If track jumping is detected during recording, the memory controller 24 stops the transfer of data to the encoder/decoder circuit 26 but continues to accumulate compressed data from the processing circuit 23 in the buffer memory 25. Then, after the recording position has been restored to the correct track position following the track jumping, the memory controller 24 resumes the transfer of compressed data from the buffer memory 25 to the encoder/decoder circuit 26.

Detection of whether or not track jumping has occurred can be performed by detecting, for example, from the vibration detection output of a vibration sensor provided on the recording and reproduction apparatus, whether or not a physical disturbance of the apparatus is sufficiently great to cause track jumping. Moreover, since the disk 1 has absolute address codes recorded in an overlapping relationship with a wobbling signal for tracking control thereon upon formation of pregrooves as described above, an absolute address code may be read, during recording, from such pregrooves to detect track jumping from such decoded output. It is to be noted that, when track jumping has occurred, the power of the laser light for magneto-optical recording is decreased so that the data recorded at the position to which the optical pickup has jumped will not be erased.

Then, correction of the recording position when track jumping has occurred can be performed using the absolute address codes.

It will be appreciated from the above description that the data capacity of the buffer memory 25 in this instance is required to be at least that which will allow storage of compressed data for the period of time that elapses between track jumping occurring and the recording position being corrected. In the present recording and reproduction apparatus, the buffer memory 25 has a capacity of 1 to 4 Mbits as described above, which is sufficient to satisfy the requirement described above.

Output data in units of a cluster from the data encoder/decoder circuit 26 are supplied to the recording encoder circuit 27. The recording encoder circuit 27 processes the data by coding processing for error detection and correction and further processes the data by modulation processing suitable for recording such as, for example, EFM coding processing. A code such as the CIRC (cross-interleave Reed-Solomon code) of a CD having a modified interleave, as disclosed in U.S. patent application Ser. No. 07/747,001, now U.S. Pat. No. 5,325,371 is preferably employed as the code for error detection and correction. Then, since recording data are recorded intermittently in units of a cluster, plural sectors (which will be referred to as linking sectors) for linking consecutive clusters in linking recording are added to the beginning and the end of each cluster of 32 sectors of audio data.

Figure 7:
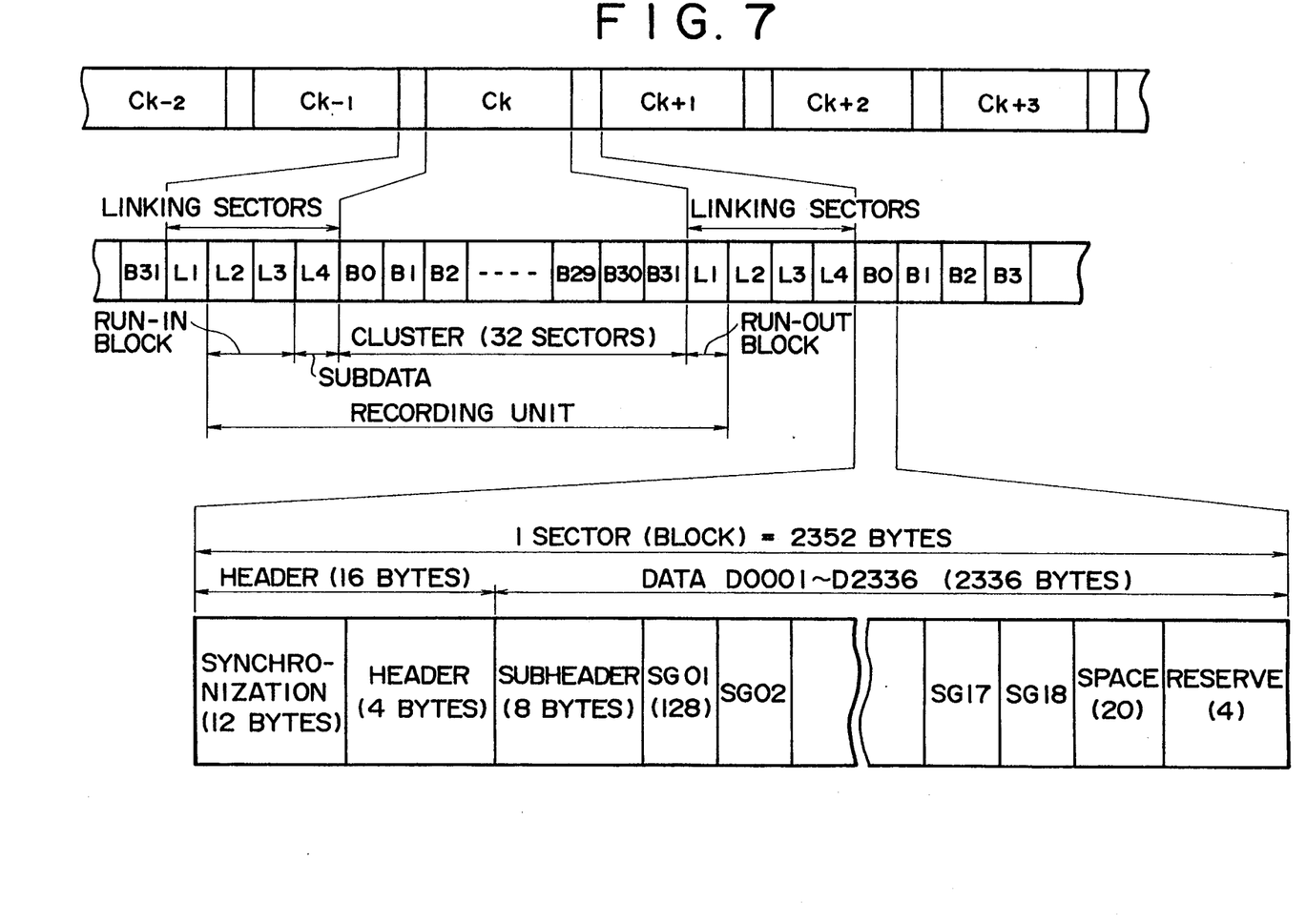
FIG. 7 is a diagrammatic view showing a unit of data intermittently recorded or reproduced by the disk recording and reproducing apparatus of FIG. 6.

FIG. 7 illustrates the recording data after encoding processing by the recording encoder 27. In FIG. 7, reference characters $Ck$, $Ck+1$, $Ck+2$, . . . denote the $k$th, $(k+1)$th, $(k+2)$th, . . . cluster of recording data, respectively. In particular, the recording data are arrayed with four linking sectors L1 to L4 interposed between the units of 32 sectors B0 to B31. In this instance, when a cluster, for example, the cluster $Ck$, is to be recorded, three linking sectors are added to the beginning of the 32 sectors B0 to B31 of the cluster $Ck$, and one linking sector is added to the end of the cluster $Ck$, as shown in FIG. 7. Consequently, the recording unit including each cluster is consists of 36 sectors.

The linking sectors added to the beginning of the cluster $Ck$ are two sectors L2 and L3 which provide a run-in block and one sector L4 which accommodates subdata. The sector L4 for subdata is an area which is undefined at present. The sector L1 added to the end of the cluster $Ck$ is provides a runout block. Recording data are intermittently handled in recording units of 36 sectors in this manner.

Referring now to FIG. 6, while the recording encoder 27 performs interleave processing with an interleave length of 108 frames (corresponding to about 1.1 sectors) for the recording data of one cluster by processing of the CIRC described above, the recording data of the cluster are accommodated within the range of the linking sectors L1 to L4 and are independent of the recording data in preceding and following clusters.

Particular pattern data, which can be distinguished from the data of any other sector, for example, dummy data of all zero, are arranged in the linking sectors L1 to L3. However, such data are excluded from the sector L4, which is reserved for subdata. Since such pattern data, which can be distinguished from data of any other sector, are recorded in the linking sectors L1 to L3 in this manner, the linking sectors L1 to L3 can be detected by detecting the particular pattern data, and the position of these sectors can be detected as a linking position as will be described below.

The data after processing with coding processing by the recording encoder 27 are supplied to the magnetic head drive circuit 28, which drives the magnetic head 29. The magnetic head drive circuit 28 drives the magnetic head 29 to cause the magnetic head to apply a magnetic field, modulated in accordance with the recording data, to the magneto-optical disk 1. The recording data are supplied to the magnetic head 29 in recording units including one cluster so that recording is performed intermittently.

The disk 1 is accommodated in the cartridge 2. When the cartridge 2 is loaded in position into the recording and reproduction apparatus, a shutter plate (not shown) of the cartridge 2 is opened to expose the disk 1 through the shutter opening in the cartridge 2. Then, the rotating shaft of the disk drive motor 30M is inserted into the spindle insertion opening of the cartridge 2 and is connected to the disk 1 to enable the disk drive motor 30M to rotate the disk 1. In this instance, the rotational velocity of the disk drive motor 30M is controlled by the servo control circuit 32, which will be described below, to rotate the disk to provide a linear velocity of 1.2 to 1.4 m/s between the recording track and the magnetic head 29.

The magnetic head 29 is opposed to the disk 1 exposed by the shutter opening of the cartridge 2. The optical head 30 is located in an opposing relationship to the face of the disk opposite to the face opposing the magnetic head 29. The optical head 30 includes optical parts including a laser light source such as, for example, a laser diode, a collimator lens, an objective lens, a polarizing beam splitter, a cylindrical lens and so forth, a photodetector, and some other elements. During recording, the optical head irradiates laser light of a fixed power, higher than that used for reproduction, upon the recording track. By this irradiation of laser light, and the application of a modulated magnetic field by the magnetic head 29, the recording data are recorded onto the disk by thermo-magnetic recording. The magnetic head 29 and the optical head 30 are disposed on opposite sides of the disk for movement as a unit in the radial direction of the disk 1.

During recording, the output of the optical head 30 is supplied via the RF circuit 31 to the absolute address decoder circuit 34, where the absolute address codes reproduced from the pregroove of the disk 1 are extracted from the received information and are then decoded. The decoded absolute address codes are supplied to the recording encoder circuit 27, where they are inserted as absolute address information into the recording data and are recorded together with the recording data onto the disk 1. The absolute address codes from the absolute address decoder circuit 34 are also supplied to the system controller 20 where they are used for recognition of recording information and position control as described above. Then, each cluster is recorded at the absolute address position on the disk 1 indicated by the absolute address information recorded in the data.

Here, the sectors B0 to B31 of audio data of each cluster are provided with sector numbers indicated by (00) to (1F) when represented in two-digit hexadecimal notation. Further, the linking sector L1 is provided with a sector number indicated by (FC), the linking sector L2 by (FD), the linking sector L3 by (FE), and the subdata sector L4 by (FF). Those sector numbers are included in the absolute address information. Accordingly, as hereinafter described, the positions of the linking sectors L1 to L3, that is, a linking position, can be detected from the absolute address information in the recording data. Further, since each of the absolute addresses codes recorded in advance on the pregrooves of the disk 1 is coincident with the absolute address information in the recording data as described above, the linking position can be detected using the absolute address codes reproduced from the pregrooves.

The signal from the RF circuit 31 is supplied to the servo control circuit 32, in which a servo control signal for servoing rotation of the motor 30M to provide a fixed linear track-to-head velocity is derived from the signal reproduced from the pregrooves of the disk 1, and the rotational velocity of the motor 30M is controlled in accordance with the servo control signal.

After completion of a recording, data regarding the recording are recorded onto the TOC on the innermost circumference of the disk 1. The TOC data include absolute position information indicating the positions of the linking portions in units of one cluster. Accordingly, it is possible to detect the position of each linking portion using the TOC data.

Reproduction System of the Recording and Reproduction Apparatus

The present recording and reproduction apparatus can reproduce two kinds of disks, namely, a playback-only optical disk, which is used exclusively for reproduction, and a re-writable magneto-optical disk. The two kinds of disks can be distinguished by detecting, when the disk cartridge 2 is loaded in position in the apparatus, an identification hole or holes formed in the disk cartridge 2. Further, since a playback-only optical disk and a re-writable magneto-optical disk have different light reflection factors, they can be distinguished from each other by the amount of light reflected. Though not shown, a signal identifying the kind of disk is supplied to the system controller 20.

The disk 1 loaded in position in the recording and reproduction apparatus is rotated by the disk drive motor 30M. Then, as during recording, the servo control circuit 32 controls the rotational velocity of the disk drive motor 30M in response to a signal reproduced from the pregrooves of the disk 1 so that the disk 1 is rotated at the same rate as during recording, that is, at a rate that provides a track-to-head linear velocity of 1.2 to 1.4 m/s.

During reproduction, the optical head 30 detects light from the laser reflected from the object track to detect focusing errors, by, for example, the astigmatism method and to detect tracking errors by, for example, the push-pull method. Further, when the disk 1 is a playback-only optical disk, the optical head 30 detects the reproduction signal using the diffraction caused by a train of pits disposed along the object track. When the disk 1 is a rewritable magneto-optical disk, the optical head 30 detects differences in polarization angle (Kerr rotation angle) of the light reflected from the object track to detect the reproduction signal.

Under control of the system controller 20, the optical head 30 intermittently reads the reproduction data from the disk 1 in fixed units, each of which includes one cluster.

The output of the optical head 30 is supplied to the RF circuit 31. The RF circuit 31 extracts a focusing error signal and a tracking error signal from the output of the optical head 30 and supplies the extracted signals to the servo control circuit 32. Further, the RF circuit 31 digitizes the reproduction signal and supplies the digitized reproduction signal to the reproduction decoder circuit 33.

The servo control circuit 32 performs focusing control of the optical system of the optical head 30 to reduce the focusing error signal to zero, and executes tracking control of the optical system of the optical head 30 to reduce the tracking error signal to zero.

Further, the RF circuit 31 extracts the absolute address codes reproduced from the pregrooves of the disk 1 and supplies them to the absolute address decoder circuit 34. The decoder circuit 34 supplies the absolute address codes to the system controller 20 which uses them for controlling the position of the optical head 30 in the radial direction of the disk. Further, the system controller 20 can also use the address codes in units of a sector extracted from the reproduced data to control the position of the optical head 30 on the recording track.

During reproduction, the compressed data read out from the disk 1 are written into and are read out from the buffer memory 25 and are then expanded as will be described below. In this instance, due to a difference in transfer rate between the data written into the buffer memory 25 and the data read out of the buffer memory 25, the timing of the intermittent reading out of data by the optical head 30 from the disk 1 is controlled by the system controller 20 while, for example, the amount of data stored in the buffer memory 25 is controlled by the memory controller 24 such that it is prevented from falling below a predetermined level.

The data read out from the disk 1 are supplied to the reproduction decoder circuit 33 via the RF circuit 31. The reproduction decoder circuit 33 receives the digitized reproduction signal from the RF circuit 31 and performs processing complementary to that performed by the recording encoder circuit 27, that is, EFM decoding processing, decoding processing for error detection and correction, interpolation processing and so forth.

The processing routine for error detection and correction to be executed by the reproduction decoder circuit 33 is divided into an ordinary data processing portion and a linking portion processing portion for a linking recording. At each linking portion, the processing routine performs error correction using only the C1 series. Operation of the wrong correction detection means in the C2 series is inhibited.

The reproduction decoder circuit 33 supplies output data to the data encoder/decoder circuit 26. The data encoder/decoder circuit 26 operates as a decoder circuit during reproduction and decodes data having the sector structure of a CD-ROM back into original compressed data.

The data encoder/decoder circuit 26 transfers output data to the buffer memory 25 under control of the memory controller 24 so the output data are written at a predetermined writing rate into the buffer memory 25.

Then, during normal reproduction, during which track jumping, in which the reproduction position jumps as a result of vibration or some other cause, does not occur, the memory controller 24 transfers the compressed data from the buffer memory 25 to the data compression/expansion circuit 23 at a transfer rate substantially equal to about one fifth the writing rate. In this instance, the memory controller 24 controls writing into and reading from the buffer memory 25 so that the amount of data stored in the buffer memory 25 does not fall below the predetermined level.

On the other hand, when an occurrence of track jumping is detected during reproduction, the memory controller 24 stops writing data from the data encoder/decoder circuit 26 into the buffer memory 25 under control of the system controller 20. Only transfer of compressed data from the buffer memory 25 to the data compression/expansion circuit 23 is performed. Then, when the reproduction position is corrected following the track jumping, the memory controller 24 resumes writing compressed data from the encoder/decoder circuit 26 into the buffer memory 25.

Detection of whether or not track jumping has occurred is performed, as during recording, by a method which employs, for example, a vibration detector, or another method which makes use of the absolute address codes recorded on the pregrooves of the optical disk in an overlapping relationship with the wobbling signal provided for tracking control, i.e., the output of the absolute address decoder circuit 34. As a further alternative, both a vibration detector and the absolute address codes may be used. Further, during reproduction, since absolute address information and address information in units of a sector are extracted from reproduced data as described above, such information can be utilized for the detection of track jumping.

As will be appreciated from the above description, the buffer memory 25 must have sufficient capacity to store the amount of data corresponding to the time required to correct the reproduction position after an occurrence of track jumping. The reason is that, if the buffer memory 25 has such a capacity, then, even if track jumping occurs, the buffer memory can continue to transfer data to the data compression/expansion circuit 23 even though the supply of data from the data encoder/decoder circuit 26 is temporarily interrupted. A capacity of 1 to 4 Mbits of the buffer memory 25 in the present embodiment is selected as a sufficient capacity to satisfy the requirement described above.

Further, as also described above, during normal operation, the memory controller 24 executes memory control so that an amount of compressed data greater than a predetermined minimum amount is stored in the buffer memory 25. In this instance, for example, if the amount of data of the buffer memory 25 falls below the predetermined level, then the memory controller 24 delivers a data reading request to the system controller 20. This causes data to be intermittently read from the disk 1 by means of the optical head 30 and stored into the buffer memory 25 from the data encoder/decoder circuit 26. This ensures that an amount of compressed data greater than the predetermined amount is stored in the buffer memory 25.

During reproduction, the data compression/expansion circuit 23 acts as a data expansion circuit and thus fetches compressed data from the buffer memory 25 into an internal buffer memory (not shown), and then performs processing complementary to the data compression processing that was performed during recording to expand the compressed data by about 5 times.

The digital audio data from the data compression/expansion circuit 23 are supplied to the digital-to-analog converter 35, in which they are converted back into a two-channel analog audio signal. The analog audio signal is outputted from the output terminal 37. It is to be noted that digital audio data before digital-to-analog conversion may be outputted as a digital output signal from the output terminal 37.

Error Detection and Correction Method

As mentioned above, the error detection and correction method using data in the C1 and C2 series executed by the reproduction decoder circuit 33 is different between the intermittent linking portions between successive recording units, each including a cluster, and the other portions. At each linking portion, the parity calculation of the C2 series is not performed, and the wrong correction detection means is rendered inoperative.

Figure 8:
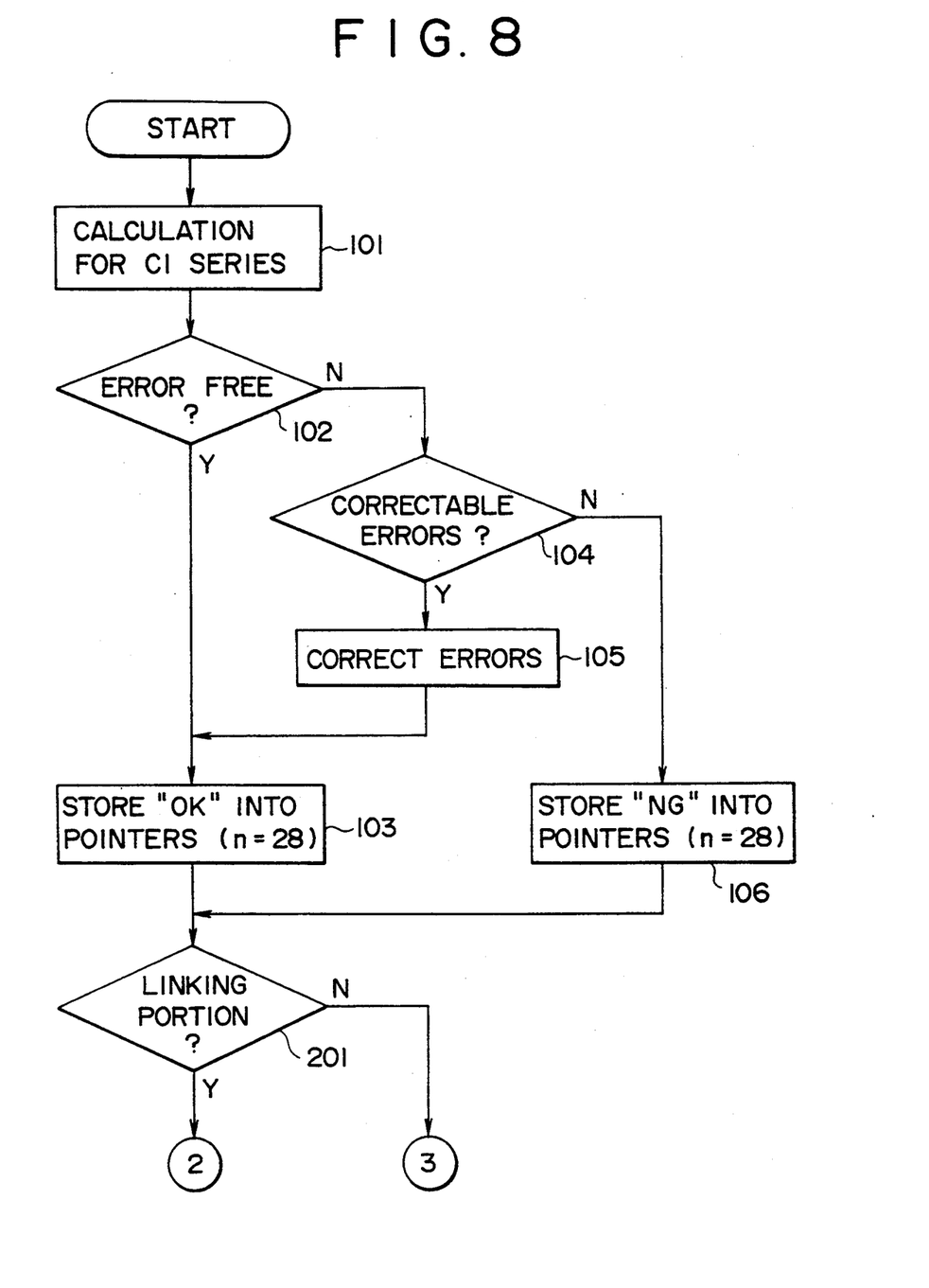
FIGS. 8 and 9 are flow charts illustrating error correction decoding processing of the recording and reproducing apparatus of FIG. 6.
Figure 9:
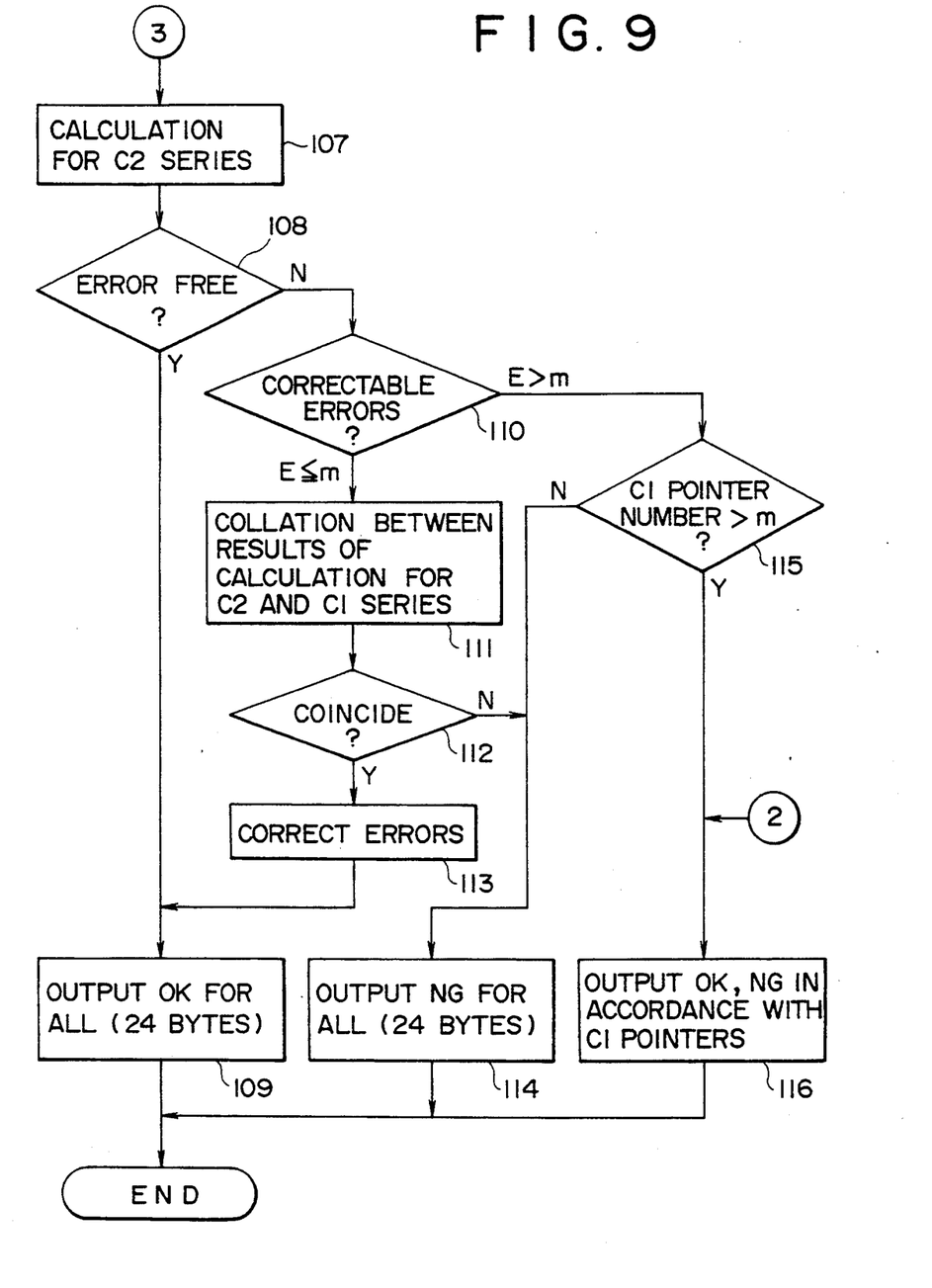

FIGS. 8 and 9 show a flow chart illustrating the error correction decoding processing executed by the reproduction decoder circuit 33. Steps in which the same processing as that performed in FIGS. 3 and 4, which illustrate conventional error correction decoding processing, are denoted by like step numbers.

In the processing illustrated by the flow charts shown in FIGS. 8 and 9, after error correction using the parity of the C1 series is performed, the control sequence does not advance immediately to error correction in which the parity of the C2 series is used. Instead, it is determined whether the reproduced data to which error correction processing is being applied belongs to a linking portion. Then, if the reproduced data have not been reproduced from a linking portion, error correction processing similar to that of the conventional arrangement, in which the parity of the C2 series is used, is performed. However, when the reproduced data have been reproduced from a linking portion, error correction processing in which the C2 series is used is not performed.

In particular, referring first to FIG. 8, following steps 103 or 106, where error correction processing based on the C1 series is performed, the control sequence does not advance directly to step 107 as shown in FIG. 3 or 4 described above, but advances to step 201. At step 201, it is determined whether or not data for which error correction processing based on the C1 series has been performed has been reproduced from a linking portion.

The following four methods can be used to make this determination, as first described above in the description of the recording system.

1. Since data of a particular pattern, in particular, data of all zero, are recorded in the linking sectors L1 to L3 recorded between consecutive recording units, each including a cluster, as a linking portion of data of linking consecutive recording units, the data of the particular pattern can be detected to determine whether or not certain data was reproduced from a linking portion.

2. Each of the linking sectors L1 to L3 has a particular sector number applied thereto. In particular, the linking sector L1 has a sector number represented by "FC"; the linking sector L2 by "FD38 ; the linking sector L3 by "FE", and the subdata sector L4 has a sector number represented by "FF". The sector number is recorded as absolute address information in the recorded data. Accordingly, by extracting the absolute address information from reproduced data and checking the sector number, any of the linking sectors L1 to L3 can be detected.

3. Data are recorded in accordance with the absolute address codes recorded in advance on the pregrooves of the disk, and the position of absolute address information included in the recorded data and the absolute address codes of the pregrooves correspond to and are the same as each other. Therefore, whether or not data have been reproduced from any of the linking sectors L1 to L3 can be determined from the absolute address codes reproduced from the pregrooves.

4. TOC data are recorded on an innermost circumferential area different from the recording data area of the disk and include information regarding the positions of linking portions. Therefore, by reading such TOC data prior to reproduction to detect the positions of the linking portions, and by comparing such position information with the absolute address codes from the absolute address decoder 34 during reproduction or with the absolute address information in the reproduced data, it can be determined whether or not the data being processed have been reproduced from a linking portion.

Using any one of the detection methods 1 to 4 described above, it is determined at step 201 whether or not the data, for which error correction processing of the C1 series has been performed, has been reproduced from a linking portion. Then, when the result of the determination reveals that the position from which the data was reproduced is not the position of a linking portion, the control sequence advances from step 201 to step 107. At step 107, the parity calculation of the C2 series is performed. At step 111, wrong correction detection using the parity calculation of the C2 series is performed. Then, in steps 108 to 116, correction of correctable errors is performed similarly in the conventional manner.

On the other hand, when the result of the determination at step 201 reveals that the position from which the data is reproduced is the position of a linking portion, the control sequence advances from step 201 to step 116. Consequently, processing of wrong error detection using the parity calculation of the C2 series and correction of correctable errors is not performed. Instead, data are outputted in accordance with the pointer indicating the result of the error correction processing using the C1 series only.

As a result of the error correction decoding processing described above, the wrong correction processing using the C2 series is not performed when the position from which the data is reproduced is that of a linking portion. Instead, only error correction based on the C1 series is performed when the position from which the data is reproduced is that of a linking portion. Accordingly, successive errors occur in only the 5 to 10 frames in the inevitable C1 error area shown in FIG. 5B. Consequently, subdata in the sector L4 can be extracted stably.

In particular, in the format of the present disk recording and reproduction apparatus, successive errors occur only in the area in which the C1 series includes an error or errors due to disruption of the clock signal from the PLL circuit, and accordingly, subdata can be recorded and reproduced stably. On the other hand, when the conventional error correction processing routine of FIGS. 3 and 4 described above is applied to data reproduced from a linking portion, since interleaving over 108 frames is performed in addition to CIRC processing, successive errors appear over 120 frames+108 frames=230 frames. Moreover, since the three linking sectors include only 98 frames×3=294 frames, if a positional error is caused by displacement in rotation of the disk, then the influence of successive errors may possibly extend to the subdata sector L4.

It is to be noted that, if the same set of subdata is recorded twice in plural different sectors L4 for subdata on the disk, then even if one of the sets of subdata is rendered non-usable by an error, the other set of subdata recorded at the other location or locations can be used, and accordingly, the subdata can be obtained with a higher degree of reliability.

It is to be noted that, while the foregoing description relates to the case wherein the present invention is applied to a reproduction apparatus for a disk (so-called mini-disk) of a size smaller than a compact disk, the present invention can be applied not only to an apparatus which records and reproduces data intermittently in this manner, but also to any other reproduction apparatus which involves reproduction of data linking-recorded on a disk.

Further, the error correction code is not limited to the CIRC, and the present invention can be applied to various error correction codes. Further, the number of series of error correction codes may be greater than 2. Further, the recording medium is not limited to a disk-shaped recording medium, and the present invention can be applied also to tapes and cards.

Having now fully described the invention, it will be apparent to one of ordinary skill in the art that many changes and modifications can be made thereto without departing from the spirit and scope of the invention as set forth herein.

What is claimed is:

1. A reproduction apparatus for a recording medium on which data coded in two or more different series by error correction coding are linking-recorded such that they are recorded at continuous positions at discontinuous points of time, comprising:

linking position detection means for detecting a linking portion of linking-recording:

wrong correction detection means for detecting wrong correction based on the error correction code; and means for rendering said wrong correction detection means inoperative at the linking portion detected by said linking position detection means.

2. A reproduction apparatus for a recording medium on which unit data obtained by processing a predetermined amount of data, to which linking data are added, by interleave processing and coding the thus processed data in two or more different series by error correction coding are intermittently recorded for each unit data, comprising:

linking position detection means for detecting a linking portion between intermittently recorded unit data:

wrong correction detection means for detecting wrong detection based on the error correction code; and means for rendering said wrong correction detection means inoperative at the linking portion detected by said linking position detection means.

3. A reproduction apparatus according to claim 1 or 2, wherein the recorded data of the recording medium include address data representative of a recorded position of the recorded data, and said linking position detection means detects the linking position based on the address data.

4. A reproduction apparatus according to claim 1 or 2, wherein the recording medium has absolute addresses recorded in advance thereon, and said linking position detection means detects a linking position based on the absolute addresses.

5. A reproduction apparatus according to claim 1 or 2, wherein the recording medium has position information of the linking portions recorded in a recording area thereof other than the recorded data area, and the position information of the linking portions is read out from the recording medium prior to reproduction and said linking position detection means detects a linking position based on the position information of the linking portions thus read out.

6. A reproduction apparatus for a recording medium on which unit data obtained by processing a predetermined amount of data, to which dummy data of a particular pattern are added as linking data, by interleave processing and coding the thus processed data in two or more different series by error correction coding are linking-recorded such that they are recorded at continuous positions at discontinuous points of time, comprising:

linking position detection means for detecting the particular pattern to detect a linking portion of linking recording;

wrong correction detection means for detecting wrong detection based on the error correction code; and means for rendering said wrong correction detection means inoperative at the linking portion detected by said linking position detection means.

7. A reproduction apparatus for a recording medium on which data after processed by first error correction coding with a first series and then by second error correction coding with a second series different from the first series are linking-recorded such that they are recorded at continuous positions at discontinuous points of time, comprising:

linking position detection means for detecting a linking portion of linking recording; and means for causing decoding processing of an error correction code of the second series to be performed only at the linking portion.

8. A reproduction apparatus for a recording medium on which unit data obtained by processing a predetermined amount of data, to which linking data are added, by first error correction coding with a first series and then by interleave processing and coding the thus processed data by second error correction coding with a second series different from the first series are linking-recorded such that they are recorded at continuous positions at discontinuous points of time, comprising:

linking position detection means for detecting a linking portion of linking recording; and means for causing decoding processing of an error correction code of the second series to be performed only at the linking portion.

9. A reproduction apparatus according to claim 7 or 8, wherein, when error detection correction processing using the second error correction code is performed and it is detected that it is impossible to correct errors, all of data included in the second error correction code series are outputted as errors.

* * * * *

UNITED STATES PATENT AND TRADEMARK OFFICE
CERTIFICATE OF CORRECTION

| | | |
|---|---|---|
| PATENT NO. | : 5,408,478 | |
| APPLICATION NO. | : 08/107942 | |
| DATED | : April 18, 1995 | |
| INVENTOR(S) | : Takashi Ohmori et al. | |

It is certified that error appears in the above-identified patent and that said Letters Patent is hereby corrected as shown below:

Column 17, claim 1, line 6, change "wrong" to --error--;
   line 9, change "wrong" to --error--.

Column 17, claim 2, line 22, change "wrong" to --error--;
   line 25, change "wrong" to --error--.

Column 18, claim 6, line 11, change "wrong" to --error--;
   line 14, change "wrong" to --error--.

Signed and Sealed this
Nineteenth Day of July, 2011

David J. Kappos
*Director of the United States Patent and Trademark Office*